3,312,676
CROSSLINKED HYDROCARBON POLYMERS HAVING INTERMOLECULAR ANHYDRIDE CROSSLINKS
Richard Watkin Rees, Wilmington, Del., assignor to E .I. du Pont de Nemours and Company, Wilmington, Del., a corporation of Delaware
No Drawing. Filed Oct. 1, 1963, Ser. No. 312,857
8 Claims. (Cl. 260—80.5)

The present invention relates to the crosslinking of hydrocarbon polymers, and, more particularly, to the crosslinking of ethylene/carboxylic acid copolymers.

In accordance with the present invention, copolymers of ethylene with either acrylic acid or methacrylic acid are crosslinked by contact with excess anhydrides of alkanoic acids containing from 2 to 5 carbon atoms preferably at temperatures above the boiling point of the acid corresponding to the acid of the anhydride.

The acid copolymers employed in the process of the present invention are copolymers of ethylene and acrylic or methacrylic acid in which the ethylene constitutes at leaste 50 mol percent and the acid constitutes from 0.2 to 25 mol percent of the copolymer composition. In addition to the ethylene-acid interpolymers, the copolymers employed in the present invention also may contain more than two monomers. Any monomer copolymerizable with ethylene may be employed. Examples of such monomers are higher monoolefins, such as propylene, butene-1, octene-1, styrene or octadecene-1, vinyl esters and acrylic esters, such as vinyl acetate, ethyl acrylate or methyl methacrylate. In general, the number of carbon atoms in the comonomer does not exceed 18, and, preferably, is less than 8 in the polar comonomer.

The copolymers are preferably of high molecular weight having melt indices of 0.01 to 100 dg./min. (ASTM–D–1238–57T) and are prepared by a variety of methods, such as bulk copolymerization using a free radical catalyst at high pressures or by the grafting of the acid comonomer to a polyolefin base polymer.

The acid anhydrides employed in the present invention are the simple or mixed anhydrides of alkanoic acids which contain from 2 to 5 carbon atoms. Although acetic anhydride is preferred, other anhydrides, such as propionic anhydride or acetic butyric anhydride, can be equally well employed.

The crosslinking process of the present invention is carried out by shaping the acid copolymer to the desired form, e.g., a film or a fiber, and then contacting the shaped copolymer with the anhydride at any convenient temperature where the anhydride is in liquid or vapor form. The rate of crosslinking increases with increasing temperature. Temperatures which are above the boiling point of the acid resulting from the reaction are preferred since removal of the acid provides a driving force and results in a purer product. The quantity of anhydride employed is not critical although in general an excess is employed, by which is meant that the quantity of anhydride employed is greater than the quantity required to react stoichiometrically with all acid groups of the copolymer. In a preferred embodiment, the shaped acid copolymer is contacted with the refluxing vapor of the anhydride or with a solution of the anhydride maintained close to or at the boiling point of the anhydride. Since the boiling point of the acid is always below that of the anhydride, such temperatures assure the vaporization of the acid formed. The reaction proceeds extremely rapidly and, thus, can be carried out continuously on a continuous shape such as a fiber or a film. As will be apparent, the acid copolymer remains solid during the reaction. Nevertheless, the crosslinking is not confined to the surface but occurs throughout the polymer composition. If desirable, the crosslinked article may be further subjected to drying to remove traces of either the anhydride or the acid which remain in the copolymer after the reaction.

The invention is further illustrated by the following examples.

*Example I*

Several 60 mil sheets of an ethylene/methacrylic acid interpolymer containing 10 percent by weight of the copolymer of methacrylic acid and having a melt index of 5.8 dg./min. are suspended in refluxing acetic anhydride vapor for 30 and 60 seconds. The melt index after 30 seconds is 0.003 dg./min. and after 60 seconds is too low to be measured and, thus, exposure of 60 seconds results in a completely crosslinked material.

*Example II*

Example I is repeated using a terpolymer of ethylene/methyl methacrylate and methacrylic acid containing the monomers in a 80:12:8 weight ratio respectively. On exposure for 60 seconds in the acetic anhydride vapor, there is obtained a no-flow polymer.

*Example III*

A 10 mil film of an ethylene/ethyl acrylate/acrylic acid copolymer containing the monomers in a 90:6:4 weight ratio respectively is dipped into boiling butyric anhydride for a period of 2 minutes. Resulting polymer exhibits no measurable melt flow.

*Example IV*

A 10 mil film of ethylene/vinyl acetate/methacrylic acid copolymer containing the monomers in an 80:15:5 weight ratio respectively is suspended in acetic anhydride vapors for a period of 2 minutes. The resulting film exhibits no measurable melt flow and no dripping or drooling is observed when the polymer is heated to 170° C. for several hours.

*Example V*

To a 96:4 ethylene/butene copolymer is grafted 3 percent, by weight of the copolymer, of methacrylic acid. The resulting copolymer is exposed to acetic anhydride vapors. A no-flow polymer is obtained.

The crosslinked ethylene polymers described in the foregoing examples are characterized by intermolecular links having the structure

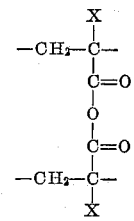

where X is a hydrogen or a methyl radical.

The crosslinking obtained by the process of the present invention improves those properties normally improved by the conventional crosslinking methods, particularly mechanical properties at elevated temperatures. Although the crosslinks are stable under normal use conditions, the crosslinks can be made to revert back to the acid groups by treatment with concentrated inorganic acids. Hence, contrary to the conventional crosslinking methods, the process of the present invention results in crosslinked materials which can be reclaimed and reused.

I claim:
1. A crosslinked copolymer of at least 50 mol percent ethylene with from 0.2 to 25 mol percent of an ethyleni- cally unsaturated aicd selected from the group consisting of acrylic acid and methacrylic acid and from 0 to 49.8 mol percent of a third comonomer component selected from the group consisting of vinyl esters, esters of acrylic acid, esters of methacrylic acid, styrene, and 1-olefins containing from 3 to 18 carbon atoms, said crosslinked copolymer of ethylene being characterized as having intermolecular anhydride crosslinks.

2. The crosslinked copolymer of claim 1 wherein the ethylenically unsaturated acid is methacrylic acid.

3. The crosslinked copolymer of claim 2 wherein the third comonomer component is vinyl acetate.

4. The crosslinked copolymer of claim 2 wherein the third comonomer component is methyl methacrylate.

5. The crosslinked copolymer of claim 1 wherein the ethylenically unsaturated acid is acrylic acid.

6. A crosslinked copolymer of claim 5 wherein the third comonomer component is ethyl acrylate.

7. The crosslinked copolymer of claim 1 wherein the copolymer is a copolymer of at least 75 mol percent ethylene and from 0.2 to 25 mol percent methacrylic acid.

8. The process of preparing shaped articles of a crosslinked copolymer of at least 50 mol percent ethylene with from 0.2 to 25 mol percent of an ethylenically unsaturated acid selected from the group consisting of acrylic acid and methacrylic acid and from 0 to 49.8 mol percent of a third comonomer component selected from the group consisting of vinyl esters, esters of acrylic acid, esters of methacrylic acid, styrene, and 1-olefins containing from 3 to 18 carbon atoms, said copolymer being characterized as having intermolecular anhydride crosslinks, which comprises shaping said copolymer of ethylene into an article and contacting the shaped article with the vapor of boiling acetic anhydride for a period of from 30 seconds to 2 minutes.

References Cited by the Examiner
UNITED STATES PATENTS

| | | | |
|---|---|---|---|
| 2,920,067 | 1/1960 | Mortimer | 260—88.2 |
| 3,137,660 | 6/1964 | Jones | 260—80.3 |

JOSEPH L. SCHOFER, *Primary Examiner.*

JAMES A. SEIDLECK, *Examiner.*

W. HOOVER, *Assistant Examiner.*